United States Patent
DiGirolamo et al.

(10) Patent No.: US 9,572,089 B2
(45) Date of Patent: Feb. 14, 2017

(54) METHOD AND APPARATUS FOR SUPPORTING HOME NODE B SERVICES

(75) Inventors: Rocco DiGirolamo, Laval (CA); Christopher R. Cave, Verdun (CA); Paul Marinier, Brossard (CA); Diana Pani, Montreal (CA); Benoit Pelletier, Roxboro (CA); Stephen E. Terry, Northport, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 1052 days.

(21) Appl. No.: 12/239,253

(22) Filed: Sep. 26, 2008

(65) Prior Publication Data
US 2009/0104905 A1 Apr. 23, 2009

Related U.S. Application Data

(60) Provisional application No. 60/975,835, filed on Sep. 28, 2007, provisional application No. 61/048,104, filed on Apr. 25, 2008.

(51) Int. Cl.
*H04W 4/00* (2009.01)
*H04W 48/12* (2009.01)
(Continued)

(52) U.S. Cl.
CPC .......... *H04W 48/12* (2013.01); *H04J 11/0093* (2013.01); *H04W 64/003* (2013.01); *H04W 84/045* (2013.01)

(58) Field of Classification Search
USPC .... 455/432.1, 432.2, 432.3, 434, 458, 456.1
See application file for complete search history.

(56) References Cited

U.S. PATENT DOCUMENTS 6,801,772 B1 * 10/2004 Townend et al. ............. 455/436
6,826,414 B1    11/2004 Reynolds et al.
(Continued)

FOREIGN PATENT DOCUMENTS

CN   1582006 A   2/2005
CN   1968287 A   5/2007
(Continued)

OTHER PUBLICATIONS

Ericsson (3GPP TSG-RAN WG2#59.*
(Continued)

*Primary Examiner* — Vladimir Magloire
*Assistant Examiner* — Sayed T Zewari
(74) *Attorney, Agent, or Firm* — Condo Roccia Koptiw LLP

(57) ABSTRACT

A method and apparatus for supporting home Node B (HNB) services are disclosed. A wireless transmit/receive unit (WTRU) receives HNB access restriction information from an HNB and accesses the HNB if an access to the HNB is allowed based on the HNB access restriction information. The HNB access restriction information may be a closed subscriber group identity (CSG ID), a status bit indicating whether an HNB cell is available or not, an identity of WTRUs that are allowed to access the HNB, information indicating whether an access to a cell is barred or not. The WTRU may trigger measurements for cell reselection even though signal strength on a currently connected cell is above a threshold. The measurement may be triggered manually, periodically, under the instruction from the network, or based on a neighbor cell list including information about HNB cells located nearby.

36 Claims, 3 Drawing Sheets

(51) Int. Cl.
  *H04J 11/00* (2006.01)
  *H04W 84/04* (2009.01)
  *H04W 64/00* (2009.01)

(56) References Cited

U.S. PATENT DOCUMENTS

| | | | |
|---|---|---|---|
| 6,889,040 B1* | 5/2005 | Koo et al. | 455/418 |
| 8,165,590 B2 | 4/2012 | Gunnarsson et al. | |
| 2002/0187793 A1* | 12/2002 | Papadimitriou et al. | 455/458 |
| 2003/0054807 A1 | 3/2003 | Hsu et al. | |
| 2003/0139180 A1 | 7/2003 | McIntosh et al. | |
| 2003/0143997 A1* | 7/2003 | Sawada et al. | 455/432 |
| 2004/0156330 A1 | 8/2004 | Yi et al. | |
| 2006/0034236 A1 | 2/2006 | Jeong et al. | |
| 2006/0077926 A1* | 4/2006 | Rune | 370/328 |
| 2007/0097938 A1* | 5/2007 | Nylander et al. | 370/338 |
| 2007/0105568 A1* | 5/2007 | Nylander et al. | 455/458 |
| 2007/0173254 A1 | 7/2007 | Tebbit et al. | |
| 2007/0183427 A1 | 8/2007 | Nylander et al. | |
| 2007/0270152 A1* | 11/2007 | Nylander et al. | 455/445 |
| 2008/0085699 A1* | 4/2008 | Hirano et al. | 455/414.2 |
| 2009/0011757 A1* | 1/2009 | Tenny | 455/425 |
| 2009/0047968 A1* | 2/2009 | Gunnarsson et al. | 455/446 |
| 2009/0070694 A1* | 3/2009 | Ore et al. | 715/764 |
| 2010/0029283 A1 | 2/2010 | Iwamura | |

FOREIGN PATENT DOCUMENTS

| | | |
|---|---|---|
| EP | 1626606 A1 | 2/2006 |
| JP | 2003-506960 A | 2/2003 |
| JP | 2006-174153 A | 6/2006 |
| JP | 2008-508832 A | 3/2008 |
| JP | 2008-552128 A | 10/2010 |
| JP | 2011-512045 A | 4/2011 |
| RU | 2280951 C2 | 7/2006 |
| WO | WO 98/02008 A2 | 1/1998 |
| WO | WO 01/11804 A1 | 2/2001 |
| WO | WO 2006/019237 A1 | 2/2006 |
| WO | WO 2008/081816 A1 | 7/2008 |
| WO | 2008/134281 | 11/2008 |

OTHER PUBLICATIONS

Third Generation Partnership Project, "Technical Specification Group Radio Access Networks; 3G Home NodeB Study Item Technical Report (Release 8)", 3GPP TR 25.820 V8.0.0, (Mar. 2008).
Third Generation Partnership Project, "Technical Specification Group Radio Access Networks; 3G Home NodeB Study Item Technical Report (Release8)", 3GPP TR 25.820 V0.1.0, (Jun. 2007).
Third Generation Partnership Project, "Technical Specification Group Radio Access Networks; 3G Home NodeB Study Item Technical Report (Release 8)", 3GPP TR 25.820 V8.2.0, (Sep. 2008).
Third Generation Partnership Project, "Technical Specification Group Radio Access Network; Evolved Universal Terrestrial Radio Access (E-UTRA)) and Evolv ed Universal Terrestrial Radio Access Network (E-UTRAN); Overall Description; Stage 2 (Release 8)", 3GPP TS 36.300 V8.1.0, (Jun. 2007).
Third Generation Partnership Project, "Technical Specification Group Radio Access Network; Evolved Universal Terrestrial Radio Access (E-UTRA)) and Evolved Universal Terrestrial Radio Access Network (E-UTRAN); Overall Description; Stage 2 (Release 8)", 3GPP TS 36.300 V8.6.0, (Sep. 2008).
Third Generation Partnership Project, "Technical Specification Group Radio Access Network; User Equipment (UE) Procedures in Idle Mode and Procedures for Cell Reselection in Connected Mode (Release 7)", 3GPP TS 25.304 V7.2.0, (Jun. 2007).
Third Generation Partnership Project, "Technical Specification Group Radio Access Network; User Equipment (UE) Procedures in Idle Mode and Procedures for Cell Reselection in Connected Mode (Release 7)", 3GPP TS 25.304 V7.7.0, (Sep. 2008).
Third Generation Partnership Project, "Technical Specification Group Radio Access Network; User Equipment (UE) Procedures in Idle Mode and Procedures for Cell Reselection in Connected Mode (Release 8)", 3GPP TS 25.304 V8.3.0, (Sep. 2008).
Third Generation Partnership Project, "Technical Specification Group Radio Access Network; Home (e)NodeB; Network Aspects (Release 7)", 3GPP TR R3.020 V0.1.0, (Apr. 2007).
Third Generation Partnership Project, "Technical Specification Group Radio Access Network; Home (e)NodeB; Network Aspects (Release 8)", 3GPP TR R3.020 V0.5.0, (Mar. 2008).
Third Generation Partnership Project, "Technical Specification Group Radio Access Network; Home (e)NodeB; Network Aspects (Release 8)", 3GPP TR R3.020 V0.9.0, (Sep. 2008).
Ericsson, "Idle state access restriction for home eNB," 3GPP TSG-RAN WG2 #59, R2-073415 (Aug. 20-24, 2007).
Nokia Siemens Networks, "[DRAFT] LS on CSG Cells Handling," 3GPP TSG-RAN WG2 #59, R2-073634 (Aug. 20-24, 2007).
Third Generation Partnership Project, "Technical Specification Group Radio Access Network; Evolved Universal Terrestrial Radio Access (E-UTRA)) and Evolved Universal Terrestrial Radio Access Network (E-UTRAN); Overall Description; Stage 2 (Release 8)", 3GPP TS 36.300 V8.1.0, (Jun. 2007).
Third Generation Partnership Project, "Technical Specification Group Radio Access Network; Home (e)NodeB; Network Aspects (Release 7)", 3GPP TR R3.020 V0.1.0, Apr. 2007).
3rd Generation Partnership Project (3GPP), R2-072831, "Signalling on a CSG Cell", Vodafone Group, 3GPP TSG RAN WG2#58bis, Orlando, US, Jun. 25-29, 2007.
3rd Generation Partnership Project (3GPP), R2-092198, "Addition of CSG cell reservation behaviour", Nokia Corporation, Nokia Siemens Networks, Change Request 25.304 CR CRNum, Current version: 8.5.0, 3GPP TSG-RAN WG2 Meeting #65bis, Seoul, South Korea, Mar. 23-27, 2009, 4 pages.
3rd Generation Partnership Project (3GPP), R3-071492, "Idle State Access Restriction for Home eNB", Ericsson, 3GPP TSG RAN WG2#57, Athens, Greece, Aug. 20-24, 2007.
3rd Generation Partnership Project (3GPP), TS 36.304 V1.0.0, "Technical Specification Group Radio Access Network, Evolved Universal Terrestrial Radio Access (E-UTRA) User Equipment (UE) Procedures in Idle Mode (Release 8)", Jun. 2007, pp. 1-24.
3rd Generation Partnership Project, (3GPP), RP-070687, "Presentation of Specification to TSG or WG", 3GPP TSG-RAN Meeting #37, Riga, Latvia, Sep. 11-14, 2007, 1 page.

\* cited by examiner

METHOD AND APPARATUS FOR SUPPORTING HOME NODE B SERVICES

CROSS REFERENCE TO RELATED APPLICATIONS

This application claims the benefit of U.S. provisional application Nos. 60/975,835 filed Sep. 28, 2007 and 61/048,104 filed Apr. 25, 2008, which are incorporated by reference as if fully set forth.

FIELD OF INVENTION

This application is related to wireless communications.

BACKGROUND

With the evolution of the third generation (3G) network and the increase of the number of wireless transmit/receive units (WTRUs) being used, operators are pursuing solutions for new services with higher data rates at reduced costs. An introduction of home Node B (HNB) is considered as a viable candidate solution and is currently being studied as part of third generation partnership project (3GPP) Release 8. The HNB offers services over relatively small service areas, such as home or office. It has a similar role to a wireless local area network (WLAN) access point (AP). The service may be provided where cellular coverage is poor or non-existent. A subscriber typically will own the HNB and have control over its final deployment location. The backhaul link from the HNB to the network may be achieved through the conventional access technologies, (e.g., digital subscriber line (DSL), cable modem, wireless, etc.). A set of HNBs are connected to a HNB gateway (GW) that provides an interface to the core network.

A subscriber is able to configure the HNB as its "desired" or "preferred" HNB by using the concept of a closed subscriber group (CSG). A CSG identifies WTRUs that are permitted to access the HNB. An HNB cell may be configured to only allow access from a set of WTRUs that are part of the CSG. This has implications for initial access registration during WTRU power up, or roaming while in an idle mode. Although legacy (pre-Release 8) mobility management signaling can be used to address the access control problem, it is not efficient. Once a WTRU camps on a cell or reselects a cell, the WTRU sends a location area (LA) update message to a network mobility management entity every time the WTRU changes an LA. The LA is broadcast in the non-access stratum (NAS) specific information within the system information block 1 (SIB1) message. If the WTRU is not part of the CSG for the HNB cell, the network will respond with a location area reject message. The WTRU may then add this LA to its "forbidden LA" list.

An idle mode WTRU may make multiple registration attempts (in vain) as the WTRU roams through an area with a high concentration of HNBs that do not have the WTRU in their CSG. This results in an increased signaling load and should be avoided.

With respect to cell reselection, a WTRU in the vicinity of its "preferred" HNB should reselect the preferred HNB cell. This implies that some mechanism must be in place to encourage this cell reselection. For 3GPP Release 7 and earlier, cell reselection measurements on neighbour cells are only triggered when the quality level of the current cell (S) is not met for $N_{serv}$ DRX cycles, or is less than $S_{intrasearch}$, $S_{intersearch}$, or $S_{searchRATm}$. These parameters are broadcast as part of the system information. This poses a problem if the WTRU should always select its preferred HNB cell if it is in its vicinity. In particular, additional mechanisms are required to trigger the measurements and once triggered, the HNB cells should be favoured. In addition, as the penetration of HNBs could be quite high, a method is needed to restrict the amount of measurements that WTRUs make in cells that are inaccessible.

All WTRUs may need to be allowed to camp on a CSG cell in order to make an emergency call. With respect to localization, an operator should be able to know the location of the HNBs in order to provide emergency services.

Another issue with respect to the HNBs is that a WTRU in URA_PCH state will send UTRAN routing area (URA) update messages when the WTRU crosses a URA boundary. URAs typically encompass a group of adjacent cells, and are defined to reduce the amount of reselection signaling as WTRUs move across cells. The network knows the location of the WTRUs at the URA level and pages a WTRU across all cells belonging to the URA. In addition, each cell may belong to more than one URA. The list of URAs is broadcast from the cell as part of the system information. For HNB deployments, the HNBs are not tied to a physical location and the user or owner of the HNB has some flexibility in terms of placement of the HNBs. Therefore, the scheme of a cell belonging to a static list of URAs may not apply in the HNB scenario. In addition, the flexible HNB deployment may also imply that idle mode paging procedures can be improved.

SUMMARY

A method and apparatus for supporting HNB services are disclosed. A WTRU receives HNB access restriction information from an HNB and accesses the HNB if it is determined that an access to the HNB is allowed based on the HNB access restriction information. The HNB access restriction information may be a closed subscriber group identity (CSG ID), a status bit indicating whether an HNB cell is available or not, an identity of WTRUs that are allowed to access the HNB, information indicating whether an access to a cell is barred/reserved or not. The WTRU may perform measurements on neighbor cells for cell reselection. In order to ensure that the WTRU uses a suitable HNB cell when available, the measurement may be triggered even though signal strength on a currently connected cell is above a threshold for cell reselection. The measurement may be triggered manually, periodically, under the instruction from the network, or based on a neighbor cell list including information about HNB cells located nearby. Parameters $S_{intrasearch}$ and $S_{intersearch}$ may be set to lower values when the WTRU enters a macro cell that includes an HNB cell for which the WTRU is part of a CSG. The measurement may be triggered if it is determined that the WTRU has entered a macro cell including an HNB based on the detected location area (LA) or cell identity. An idle mode WTRU may be paged across all cells in the LA. If this LA spans across more than one HNB gateway (GW), the WTRU may be paged first on the last accessed HNB GW and then paged in a remaining GWs that make up the LA if the WTRU is not found through the last accessed HNB GW. The URA list within an HNB cell may be changed dynamically to take into account possible HNB relocation. Alternatively, the concept of URA may be modified for HNB applications.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node B" includes but is not limited to a base station, a site controller, an access point (AP), or any other type of interfacing device capable of operating in a wireless environment. When referred to hereafter, the terminology "HNB GW" includes any device used to interface between the HNBs and the core network.

The terminology "supporting HNB features" refers to the capability of a WTRU to read and use new HNB specific information and to support and perform new HNB specific procedures. The terminology "R8 WTRU" refers to a WTRU having a capability of supporting HNB features, and the terminology "non-R8 WTRU" or "legacy WTRU" refers to a WTRU that does not have such capability. HNBs should support both R8 WTRUs and pre-R8 (legacy) WTRUs. R8 WTRUs will be able to take advantage of the new features, while the legacy WTRUs will not be able to read or interpret any of the new information elements (IEs) and will not be able to use any of the new procedures. The terminology "low speed" refers to the WTRU speed that allows a WTRU to access an HNB cell. The "low speed" limit may be controlled by the network.

Figure 1:
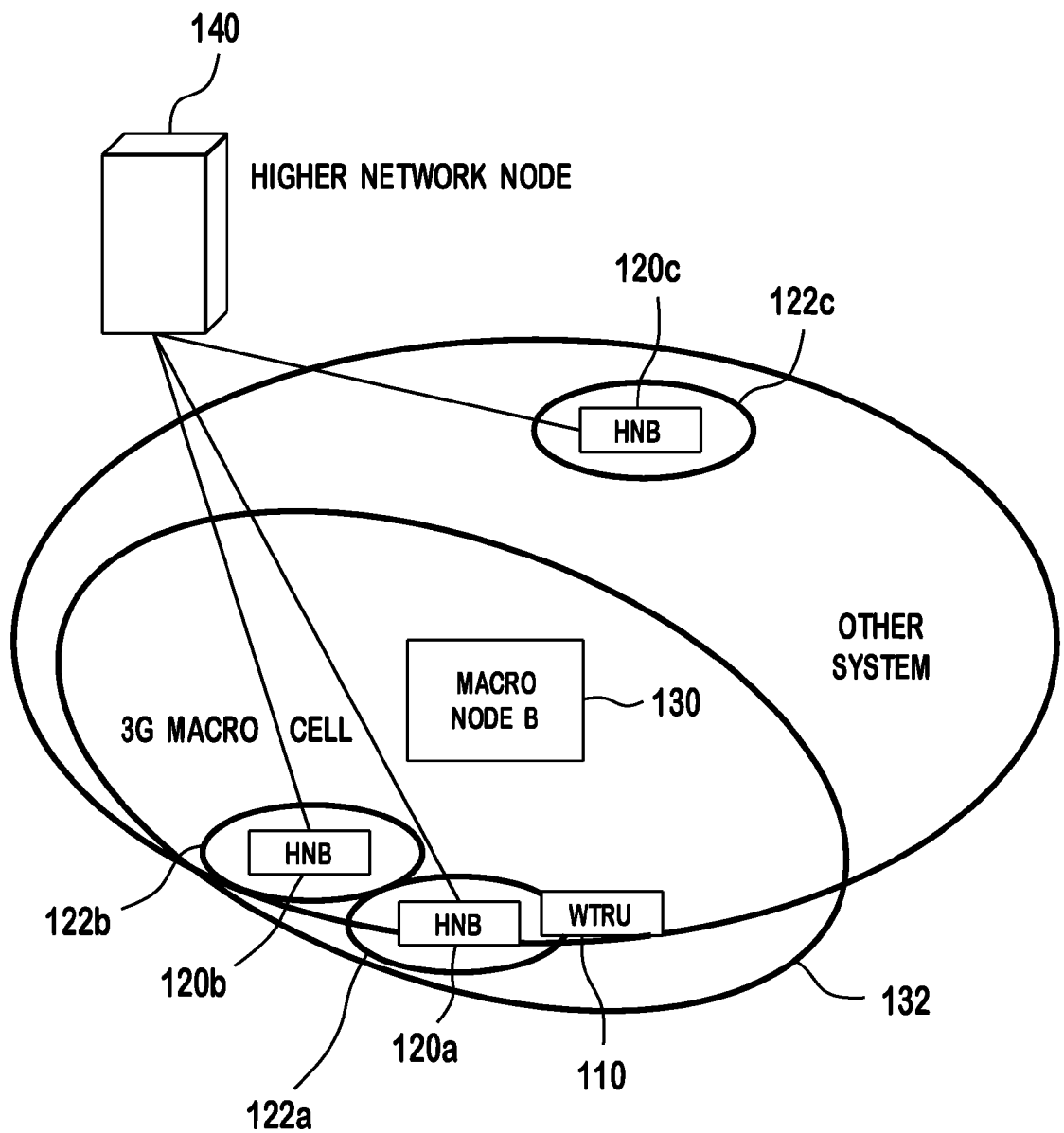
FIG. 1 shows an example HNB deployment scenario.

FIG. 1 shows an example HNB deployment scenario. HNBs 120a, 120b, 120c are deployed in three homes (not shown) and each HNB 120a, 120b, 120c is connected to a higher network node 140, (e.g., HNB GW). The HNBs 120a, 120b, and 120c cover a cell 122a, 122b, and 122c, respectively. HNBs 120a and 120b are covered by a 3G macro cell 132 that is controlled by a macro Node B 130. HNB 120c is deployed in an area where there is no 3G coverage, but covered by another system. A WTRU 110 is currently close to the HNB 120a, but may roam freely. For example, the WTRU 110 connected to HNB 120a may move to HNB 120b, to the 3G macro cell 132, or to other system cells.

Figure 2:
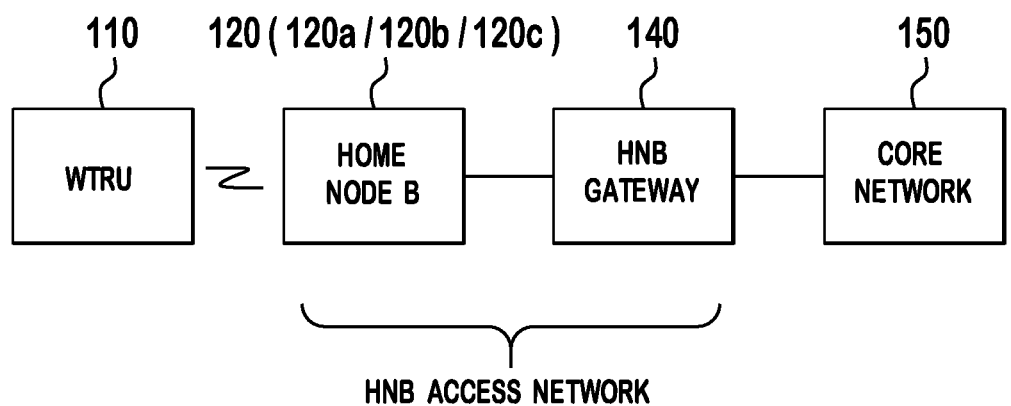
FIG. 2 shows an example network architecture for HNB deployment.

FIG. 2 shows an example network architecture for HNB deployment. The network 200 includes an HNB access network 142 and a core network 150. The HNB access network 142 includes at least one HNB 120 and at least one HNB gateway (GW) 140. HNBs 120 support WTRUs 110 with a low speed, such as less than 30 km/hr. HNBs 120 are connected to the HNB GW 140, and the HNB GW 140 communicates directly with the core network 150 through an Iu-like interface.

Embodiments for access restriction are disclosed below.

In accordance with a first embodiment, a WTRU 110 and an HNB 120 are configured with a closed subscriber group identity (CSG_ID). As stated above, only WTRUs that belong to the CSG for the HNB are allowed to access the HNB 120. The CSG_ID identifies the CSG for the HNB 120. The HNB 120 may be configured either manually or through some operation and maintenance (OAM) procedure. The WTRU 110 may be configured manually, through non-access stratum (NAS) signaling, or through access stratum (AS) signaling. The HNB 120 may broadcast its CSG_ID as part of its system information and only those WTRUs that have been configured with the same CSG_ID are allowed to attempt registration with the HNB 120. Legacy WTRUs would not be able to interpret the CSG_ID and would require an alternate method to prevent an attempt to register with the network through the HNB 120.

In accordance with a second embodiment, an HNB 120 may keep track of all WTRUs within its CSG and if all of the WTRUs in the CSG are either registered with or connected to the HNB 120, the HNB 120 may broadcast a status bit indicating to other WTRUs (those that do not belong to the CSG) that the cell is not available. This indication may be sent based on other criteria. For example, this indication may be sent when it is determined that the cell is unavailable based on high uplink or downlink load, too many WTRUs registered, high backhaul load, or the like. Alternatively, the HNB 120 may use other mechanism to indicate its busy status (such as barring the cell). This requires that the HNB 120 only bar the cell to WTRUs that are not currently registered or connected.

In accordance with a third embodiment, an HNB 120 broadcasts an identification of WTRUs that are allowed to access the HNB cell in its system information. A WTRU 110 receives the identification and cross-references its address with this information to determine if the WTRU 110 is allowed for access. For example, WTRUs may be grouped and may be identified through the group identity (GROUP_ID). The grouping may be based on one of the WTRU identities in an idle mode, (e.g., international mobile subscriber identity (IMSI)). The HNB 120 broadcasts all GROUP_IDs that are part of its CSG. A WTRU 110 attempts to register with the network via the HNB 120 if the WTRU 110 is part of one of these groups. This will reduce the number of registration attempts, as only those WTRUs that belong to the group will attempt for registration.

A flag in a bit mask may be used to indicate which group is part of the CSG. The number of bits in the mask may correspond to the number of groups. A K-bit mask would correspond to K groups, and the group would be part of the CSG if the corresponding bit is a '1'. For example, 16 bit mask 0000 1100 0000 0001 may imply that groups 0, 10 and 11 are part of this CSG, where the least significant bit is used as a flag for group 0 and the most significant bit for group 15. As the number of WTRUs belonging to each CSG increases, the bit mask size may be increased to accommodate the larger number of GROUP_IDs that would be required.

In accordance with a fourth embodiment, in order to prevent legacy WTRUs from trying to access the HNB 120, the HNB 120 may broadcast the cell as being "barred", "reserved for further extension", or "reserved for operator use". Upon detection of the message indicating these restrictions, legacy WTRUs refrain from accessing the HNB cell. If a cell is marked as "barred", the HNB may use the "intra-frequency cell reselection indicator" to further tailor cell selection/reselection. For instance, if the HNB 120 is on a separate frequency from the macro Node B 130, the HNB 120 may also broadcast the cell as being "not allowed" in an information element "intra-frequency cell re-selection indicator" which bars the entire frequency from future cell reselection attempts for the legacy WTRUs.

Broadcasting the cell as being reserved for future extension has an effect of barring the cell and not allowing the frequency to be used in future cell reselections. As a result, it requires that the HNB 120 and the macro Node B 130 be on separate frequencies. Broadcasting the cell as being reserved for operator use has an effect of barring the cell and not allowing the frequency to be used in future cell reselections, (for all WTRUs of Class 0-9 and 12-14). As a result, it requires that the HNB 120 and the macro Node B 130 be on separate frequencies.

An additional indication may be required to indicate that the cell is an HNB cell so that R8 WTRUs, (WTRUs supporting HNB features), are allowed access to the HNB cell. For example, this may be done by a new 2-bit IE, (Cell_Status bits), to indicate the cell is an HNB cell as shown in Table 1.

TABLE 1

| Cell_Status | Interpretation |
|---|---|
| 00 | Non-Home Node B cell |
| 01 | Home Node B cell (not barred) |
| 10 | Home Node B cell (barred) |
| 11 | Reserved for future use |

Alternatively, the R8 WTRUs may implicitly detect that this cell is an HNB cell by means of other SIB information transmitted from the cell, such a CSG broadcast from the cell or any other HNB-only information. Once the cell is determined to be an HNB cell, the R8 WTRUs ignore the barring of the cell and try to connect or camp on it.

Embodiments for cell reselection to HNB are disclosed below.

The conventional cell reselection procedure starts taking measurements on other frequencies or other cells once the signal strength of the currently connected cell goes below a configured threshold. However, with the introduction of HNBs the WTRU may prefer to be connected to the HNB even if the signal strength of the current cell is above the configured threshold. The conventional cell reselection triggering criteria is modified such that the cell reselection measurement to an HNB cell is triggered even if the signal strength of the current cell is above the threshold.

The cell reselection measurement to the HNB cell may be triggered manually. A user may ask for a cell reselection when the user is in vicinity of his/her preferred HNB.

The cell reselection measurement to the HNB cell may be triggered periodically. A WTRU 110 that is part of the CSG may be configured to periodically check for HNBs. Periodic searching may be performed all the time, when the WTRU 110 is in the vicinity of the HNB 120, or when the WTRU 110 is connected to a configured public land mobile network (PLMN).

The cell reselection to the HNB cell may be facilitated by setting the parameters $S_{intrasearch}$ and $S_{intersearch}$ properly. A network, (e.g., radio network controller (RNC)), may set $S_{intrasearch}$ and $S_{intersearch}$ parameters to a very low values when a WTRU 110 enters a macro cell 132 that includes an HNB cell for which the WTRU 110 is part of the CSG. This would trigger the cell reselection measurements more frequently. This would trigger more frequent cell reselection measurements for legacy WTRUs as well. Therefore, as an alternative, new HNB $S_{intrasearch}$ and HNB $S_{intersearch}$ parameters may be broadcast only for the WTRUs that support HNB features.

Alternatively, the macro cell 132 may send a flag or a dedicated message indicating to the WTRU 110 to start periodic cell search.

The network may be aware of the location of HNBs 120a, 120b (with respect to the macro cell 132) and the macro cell 132 may include information about the HNB cells 122a, 122b in the neighbor list broadcast by the macro cell 132 to the WTRUs 110, (for example, as part of the intrafrequency/interfrequency cell info list). Alternatively, the macro cell 132 may broadcast a list of all CSG IDs that are supported by all the HNBs 120a, 120b covered by that macro cell. When the WTRU 110 reads the CSG ID to which the WTRU 110 belongs, the WTRU 110 triggers an HNB cell search.

Alternatively, the WTRU 110 may keep in memory the LA (or tracking area (TA) or routing area (RA), hereinafter collectively "LA") or CELL ID of the macro cell 132 in which the HNB 120 is located. When the WTRU 110 detects that the WTRU 110 has entered a macro cell 132 with the stored LA or CELL ID, the WTRU 110 automatically triggers a cell search for its HNB 120. If the HNB 120 is not detected the WTRU 110 may trigger a periodic search as long as the WTRU 110 stays connected to the macro cell 132 with the stored LA or CELL ID.

If the HNBs 120 use a separate frequency, the measurements for cell reselection from the macro cell 132 to the HNB cell 122a, 122b may be performed during forward access channel (FACH) measurement occasions, provided that the WTRU 110 prioritizes searching on the HNB inter-frequencies.

Once the WTRU 110 has triggered measurements on neighbor cells, the WTRU 110 should favor the HNB cells 122a, 122b during evaluation of its cell reselection criteria. This may be achieved by using the cell individual offsets which biases the measurements in favor of the HNB cells 122a, 122b. Alternatively, the cell reselection evaluation criteria may be modified to include priorities. Alternatively, the HNBs 120a, 120b may be configured with a different PLMN ID which may be given priority, (i.e., configured as preferred PLMN), over the macro cell's PLMN.

Release 8 WTRUs may tailor the cell reselection procedure based on stored history of camping on HNB cells. The WTRU 110 may either increase or reduce monitoring of HNB cells 122a, 122b and macro-cells 132, depending on this history. For example, if the WTRU 110 is camped or has recently been camped on an HNB cell 122a, 122b, the WTRU 110 may continue to monitor HNB cells 122a, 122b and a macro cell 132. If on the other hand the WTRU 110 has not been camped on an HNB cell 122a, 122b for some time, the WTRU 110 may monitor the HNB cells 122a, 122b less frequently. The parameters for determining the state may be configured through dedicated radio resource control (RRC) signaling, through broadcast of system information, or specified (hardcoded).

As there may be a requirement that HNBs 120 need to support only WTRUs 110 with a low speed, (e.g., less than 30 km/hr), Release 8 WTRUs may use mobility information to restrict cell selection and reselection to HNB cells. The WTRU 110 may monitor high mobility as in Release 7 by counting the number of cell reselections in a time window. If this number exceeds a threshold, the WTRU 110 declares itself a high mobility WTRU. The threshold and window size are configured by the network and may be tailored to declare high mobility when there is a high probability that the WTRU 110 is not a low speed WTRU.

A new high mobility determination procedure may be defined for WTRUs camped on HNBs, to better take into account the smaller cell size of a HNB cell. In addition, it may base the count only on cell reselection to HNB cells. For instance, a WTRU 110 may determine high mobility based on the changes or variability in best ranked cell (rather than cell reselections). The WTRU 110 may monitor the best cell in successive intervals (the duration may be based on the typical size of an HNB cell) and declare high mobility if the best cell changes frequently.

While in CELL_DCH, a WTRU 110 reports measurement results to the RNC through RRC signaling. As part of these measurements, a WTRU 110 may report that an HNB cell has become part of its detected set. If the WTRU 110 is permitted to access this HNB cell, the RNC may signal (through RRC message) to the WTRU 110 to continue monitoring this cell. If the WTRU 110 is not permitted to access the cell, the WTRU 110 may be told to ignore the cell in future measurements. In addition, if HNB cells are on a separate frequency carrier, the RNC may further block future measurements on this entire frequency if the WTRU 110 is not permitted to access the HNB. The network may have different configuration parameters (thresholds) for triggering the measurement report for a detected HNB cell vs. a macro cell.

The network may determine the location of the HNB 120 using one of the embodiments disclosed hereinafter. The HNB 120 may be provided with the capability to measure transmissions from other Node Bs. This information may be sent to the network for the HNB location determination.

Alternatively, WTRUs 110 may be told to monitor or scan all frequencies and send measurement information back to the network so that the network may determine where the HNB 120 is located based on the measurement information from the WTRUs 110. The measurement may be triggered by the macro Node B 130 through a flag in its broadcast information. Alternatively, a new RRC message may be sent to request the measurements to the network. This may require a compressed-mode like operation.

Alternatively, the WTRU 110 may simultaneously camp on two cells (a macro cell 132 and an HNB cell 122a or 122b if one is available). The WTRU 110 may time multiplex the transmissions to both cells (in uplink and downlink) so that the WTRU 110 may communicate with both cells. The network may then determine the general location of the HNB 120 with respect to the macro cell 132. The network may then direct the WTRU 110 to one of the Node Bs.

Embodiments for paging WTRUs are disclosed below.

WTRUs 110 that are camped on an HNB cell 122a, 122b (either in IDLE, CELL_PCH, or URA_PCH states), need to be paged by the network for any mobile terminated call. For IDLE mode, the network knows the location of the WTRU 110 at the LA or RA level, and pages the WTRU 110 in all cells belonging to the LA or RA. For CELL_PCH WTRUs, the network knows the location of the WTRU 100 at the cell level and WTRUs 110 are paged only in the particular cell. For URA_PCH WTRUs, the network knows the location of the WTRU 110 at the URA level and pages the WTRU 100 in all cells of the URA.

If the LA (or RA or TA) spans across more than one HNB GWs, the HNB GW may append a GW identifier to each TA/LA/RA update message. The network may then page a WTRU 110 in the last accessed HNB GW first and then in the remaining GWs that make up the TA/RA/LA.

If the TA/LA/RA spans a single HNB GW, the HNBs under the single HNB GW may be subdivided into HNB paging areas (HPAs). The HPA identity may be broadcast as part of the system information and read during cell reselection. An HPA update may be triggered when the WTRU 110 crosses an HPA boundary. The HPA update may terminate at the HNB GW. The network may send the paging message to the HNB GW, and the HNB GW forwards it to the last accessed HPA. This embodiment may also be used if the TA/RA/LA spans across more than one HNB GWs.

An HNB 120 may be provided with the capability to dynamically change (or input to the network to allow it to change) the URA list associated with an HNB cell as the HNB 120 is moved. This may be achieved by using HNB localization information. One or any combination of the following techniques can be used.

The network may assign URAs based on the overlay macro cell. That is, the URA list may be made identical to the URA list of the overlay macro cell. If the HNB 120 is moved to a new macro cell coverage area, the network may update the URA list in the HNB 120 accordingly.

Alternatively, the HNB 120 may use some location device to determine its position, (e.g., global positioning system (GPS)). The HNB 120 provides the location information to the network. The network cross-references the actual HNB location with the URA boundaries and updates the URA list if the HNB 120 is moved.

Alternatively, the network may use reported WTRU measurements to retrieve neighbor cell information and determine the general location of the HNB. The network may use this information to set up the HNB URA list.

Alternatively, the URA list may be tied to some other criteria. For instance, in campus-type deployments the managing entity may decide to segregate its HNBs according to physical location, type, or capability of the HNB (considering parameters such as capacity of HNB backhaul), or organizational structure (e.g., each department in a warehouse can have its own URA). The URA address space may be divided into K levels. For each level, a set of URA addresses are available. This set may be referenced by a group URA address. Each managing entity is assigned one or more group URA addresses, and each of these group URA addresses is associated with a set of URAs. The URA addresses within this first level are assigned by the managing entity. The HNBs may be configured with the URA list manually or through some OAM procedure. When the network pages a WTRU, a gateway may determine where to forward the paging message after it establishes the URA from the WTRU ID.

Although presented as separate embodiments, it should be noted that the embodiments disclosed above may be used alone or in combination with other embodiments. It should be further noted that many of the techniques may be applied to other radio access technologies (such as 3G long term evolution (LTE)).

Figure 3:
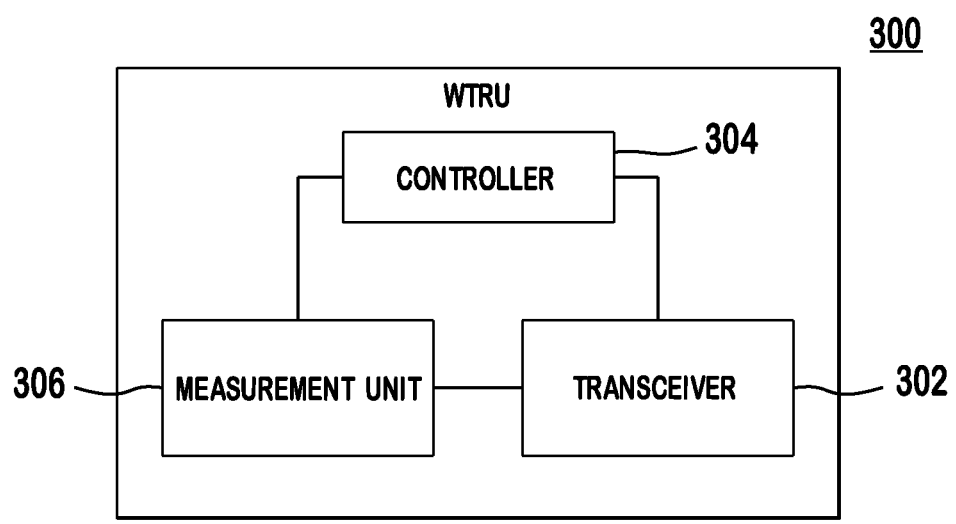
FIG. 3 is a block diagram of an example WTRU.

FIG. 3 is a block diagram of an example WTRU 300. The WTRU includes a transceiver 302 and a controller 304. The controller 304 is adapted to receive HNB access restriction information from an HNB and access the HNB if it is determined that an access to the HNB is allowed based on the HNB access restriction information, as disclosed above.

The WTRU 300 may further include a measurement unit 306 adapted to perform measurement on neighbor cells or other frequencies. The measurement for cell reselection is triggered and performed even though signal strength on a currently connected cell is above a threshold for cell reselection, as disclosed above. The controller 304 performs a cell reselection to an HNB cell if cell reselection criteria to the HNB cell are satisfied. The measurement may be triggered manually, periodically, by setting parameters $S_{intrasearch}$ and $S_{intersearch}$ to lower values when a WTRU 300 enters a macro cell that includes an HNB cell for which the WTRU 300 is part of a CSG, in accordance with a message from a network requesting a periodic cell search, based on a neighbor cell list received from a macro cell including information about HNB cells located nearby. The measurement may be triggered if it is determined that the WTRU 300 has entered a macro cell including an HNB based on the detected LA or cell identity of a macro cell. The measurement may be performed depending on WTRU mobility.

Figure 4:
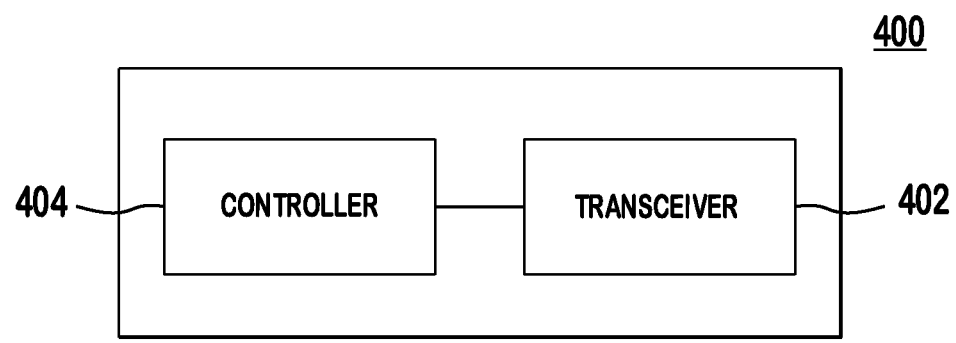
FIG. 4 is a block diagram of an apparatus, such as an HNB GW, for supporting HNB services.

FIG. 4 is a block diagram of an apparatus 400, (such as HNB GW), for supporting HNB services. The apparatus 400 includes a transceiver 402 and a controller 404. The controller 404 is configured to perform the functions and procedures stated above. For example, when a WTRU makes an LA update, the controller 404 may append a GW identifier, allowing the network to send a paging message for a WTRU to the last accessed HNB GW. The controller 404 may send the paging message to remaining GWs that make up the LA if the WTRU is not found through the last accessed HNB GW. The controller 404 may send the paging message to the last accessed HNB Paging Area (HPA) if HNBs under an HNB gateway are subdivided into HPAs. In accordance with another embodiment, the controller 404 may update a URA list associated with an HNB cell as the HNB is moved.

Figure 5:
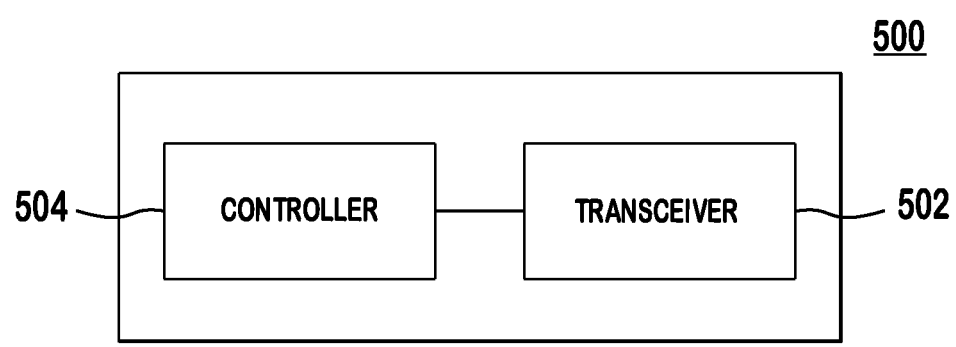
FIG. 5 is a block diagram of an example Node B.

FIG. 5 is a block diagram of an example Node B 500. The Node B 500 includes a transceiver 502 and a controller 504. The controller 504 is adapted to perform the functions and procedures for supporting the HNB services as stated above. For example, the controller 504 is adapted to send HNB access restriction information to WTRUs and accept a WTRU that is allowed to register based on the HNB access restriction information.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for receiving home Node B (HNB) services, the method comprising:
 a wireless transmit/receive unit (WTRU) receiving access restriction information from a Node B, wherein the access restriction information comprises an indication that a cell is reserved for future extension, and wherein the access restriction information comprises information capable of being interpreted by the WTRU and other WTRUs;
 the WTRU receiving a closed subscriber group (CSG) broadcast that indicates that the cell is reserved for a CSG, wherein the CSG broadcast is configured to be interpreted by the WTRU and to be unable to be interpreted by the other WTRUs;
 the WTRU interpreting the CSG broadcast; and
 the WTRU ignoring the indication that the cell is reserved for future extension and trying to connect to the Node B based on the interpretation of the CSG broadcast that indicates that the cell is reserved for the CSG.

2. The method of claim 1, further comprising the WTRU receiving a closed subscriber group identity (CSG ID).

3. The method of claim 2, wherein the CSG ID is included in a system information block (SIB) broadcast by the Node B.

4. The method of claim 1, wherein the CSG broadcast comprises a status bit indicating whether the cell is available or not.

5. The method of claim 1, wherein the WTRU supports HNB services, and wherein the other WTRUs do not support HNB services.

6. The method of claim 1, wherein the CSG broadcast is included in a system information block (SIB) broadcast by the Node B.

7. The method of claim 1, wherein the other WTRUs comprise legacy WTRUs.

8. The method of claim 7, wherein the indication that the cell is reserved for future extension indicates that the legacy WTRUs are barred from accessing the cell and that the legacy WTRUs are not allowed to use a frequency of the cell for future cell reselections.

9. A wireless transmit/receive unit (WTRU) for receiving home Node B (HNB) services, the WTRU comprising:
 a transceiver configured to transmit and receive signals; and
 a controller configured to:
  receive access restriction information from a Node B, wherein the access restriction information comprises an indication that a cell is reserved for future extension, and wherein the access restriction information comprises information capable of being interpreted by the WTRU and other WTRUs,
  receive a closed subscriber group (CSG) broadcast that indicates that the cell is reserved for a CSG, wherein the CSG broadcast is configured to be interpreted by the WTRU and to be unable to be interpreted by the other WTRUs,
  interpret the CSG broadcast, and
  ignore the indication that the cell is reserved for future extension and try to connect to the Node B based on the interpretation of the CSG broadcast that indicates that the cell is reserved for the CSG.

10. The WTRU of claim 9, wherein the controller is configured to receive a closed subscriber group identity (CSG ID).

11. The WTRU of claim 10, wherein the controller is configured to receive, via the transceiver, the CSG ID in a system information block (SIB) broadcast by the Node B.

12. The WTRU of claim 9, wherein the CSG broadcast comprises a status bit indicating whether the cell is available or not.

13. The WTRU of claim 9, wherein the WTRU supports HNB services, and wherein the other WTRUs do not support HNB services.

14. The WTRU of claim 9, wherein the controller is configured to receive, via the transceiver, the CSG broadcast in a system information block (SIB) broadcast by the Node B.

15. The WTRU of claim 9, wherein the other WTRUs comprise legacy WTRUs.

16. The WTRU of claim 15, wherein the indication that the cell is reserved for future extension indicates that the legacy WTRUs are barred from accessing the cell and that the legacy WTRUs are not allowed to use a frequency of the cell for future cell reselections.

17. The method of claim 7, wherein the WTRU is a Release 8 (R8) WTRU.

18. The WTRU of claim 15, wherein the WTRU is a Release 8 (R8) WTRU.

19. A method comprising:
sending access restriction information to a plurality of wireless transmit/receive units (WTRUs), wherein the access restriction information comprises an indication that a cell is reserved for future extension, and wherein the access restriction information comprises information capable of being interpreted by the plurality of WTRUs;
sending a closed subscriber group (CSG) broadcast that indicates that the cell is reserved for a CSG, wherein the CSG broadcast is configured to be interpreted by at least one WTRU of the plurality of WTRUs and to be unable to be interpreted by at least one other WTRU of the plurality of WTRUs; and
accepting the at least one WTRU of the plurality of WTRUs that is allowed to camp based on the interpretation of the access restriction information and the CSG broadcast that indicates that the cell is reserved for the CSG.

20. The method of claim 19, further comprising sending a closed subscriber group identity (CSG ID).

21. The method of claim 19, wherein the CSG broadcast comprises a status bit indicating whether the cell is available or not.

22. The method of claim 21, wherein the status bit is set based on at least one WTRU being camped on the cell, uplink or downlink load status, or backhaul load.

23. The method of claim 19, wherein the at least one other WTRU is a legacy WTRU.

24. The method of claim 19, wherein the indication that the cell is reserved for future extension indicates that legacy WTRUs are barred from accessing the cell and that the legacy WTRUs are not allowed to use a frequency of the cell for future cell reselections.

25. The method of claim 24, wherein an intra-frequency cell reselection indicator is used to tailor cell selection and reselection.

26. The method of claim 25, wherein the intra-frequency cell reselection indicator is used to bar an entire frequency, if the cell is on a separate frequency.

27. The method of claim 19, wherein the at least one WTRU is a Release 8 (R8) WTRU, and wherein the at least one other WTRU is a legacy WTRU.

28. A Node B comprising:
a transceiver configured to transmit and receive signals; and
a controller configured to:
send, via the transceiver, access restriction information to a plurality of wireless transmit/receive units (WTRUs), wherein the access restriction information comprises an indication that a cell is reserved for future extension, and wherein the access restriction information comprises information capable of being interpreted by the plurality of WTRUs,
send, via the transceiver, a closed subscriber group (CSG) broadcast that indicates that the cell is reserved for a CSG, wherein the CSG broadcast is configured to be interpreted by at least one WTRU of the plurality of WTRUs and to be unable to be interpreted by at least one other WTRU of the plurality of WTRUs, and
accept the at least one WTRU of the plurality of WTRUs that is allowed to camp based on the interpretation of the access restriction information and the CSG broadcast that indicates that the cell is reserved for the CSG.

29. The Node B of claim 28, wherein the controller is further configured to send a closed subscriber group identity (CSG ID).

30. The Node B of claim 28, wherein the CSG broadcast comprises a status bit indicating whether the cell is available or not.

31. The Node B of claim 30, wherein the status bit is set based on at least one WTRU being camped on the cell, uplink or downlink load status, or backhaul load.

32. The Node B of claim 28, wherein the at least one other WTRU is a legacy WTRU.

33. The Node B of claim 28, wherein the indication that the cell is reserved for future extension indicates that legacy WTRUs are barred from accessing the cell and that legacy WTRUs are not allowed to use a frequency of the cell for future cell reselections.

34. The Node B of claim 33, wherein the at least one WTRU is a Release 8 (R8) WTRU, and wherein the at least one other WTRU is a legacy WTRU.

35. The Node B of claim 33, wherein the controller is configured to send an intra-frequency cell reselection indicator to tailor cell selection and reselection.

36. The Node B of claim 35, wherein the intra-frequency cell reselection indicator is used to bar an entire frequency, if an HNB cell is on a separate frequency.

* * * * *